United States Patent [19]

Mueller

[11] Patent Number: 5,743,297
[45] Date of Patent: Apr. 28, 1998

[54] DETENT ARRANGEMENT FOR HOLDING HYDRAULIC VALVE MEMBER STROKED

[75] Inventor: Michael A. Mueller, Circle Pines, Minn.

[73] Assignee: Dana Corporation, Toldeo, Ohio

[21] Appl. No.: 806,713

[22] Filed: Feb. 27, 1997

Related U.S. Application Data

[63] Continuation-in-part of Ser. No. 609,734, Mar. 1, 1996, Pat. No. 5,638,866.

[51] Int. Cl.$^6$ .......................... F15B 13/04; F16K 11/18; F16K 31/06
[52] U.S. Cl. .......................... 137/636.2; 74/527; 74/529; 91/465; 137/596; 137/625.6; 137/625.68; 137/636.1; 251/65; 251/297
[58] Field of Search .................. 137/596, 596.1, 137/625.6, 625.68, 636, 636.1, 636.2, 868; 74/471 R, 471 XY, 475, 527, 529, 531; 91/465; 251/65, 297

[56] References Cited

U.S. PATENT DOCUMENTS

| | | | |
|---|---|---|---|
| 2,836,194 | 5/1958 | Tjaden | 137/599.2 |
| 2,958,233 | 11/1960 | Johnson | 137/636.2 |
| 3,490,495 | 1/1970 | Green | 137/636.1 |
| 3,528,638 | 9/1970 | Finley et al. | 251/73 |
| 3,667,723 | 6/1972 | Schneider | 251/68 |
| 3,698,415 | 10/1972 | Forster et al. | 137/102 |
| 3,766,944 | 10/1973 | Distler | 137/636.2 |
| 4,184,512 | 1/1980 | Pignolet | 137/596 |
| 4,195,551 | 4/1980 | Schmiel | 251/68 |
| 4,296,773 | 10/1981 | Harshman et al. | 137/312 |
| 4,342,335 | 8/1982 | Reinicker et al. | 251/297 |
| 4,445,541 | 5/1984 | Schmiel | 137/636.2 |
| 4,777,981 | 10/1988 | Petro | 137/636.2 |
| 4,827,982 | 5/1989 | Inagaki | 137/636.1 |
| 5,348,049 | 9/1994 | Yonekubo et al. | 137/636.2 |
| 5,433,249 | 7/1995 | Tsubota et al. | 137/636.2 |

FOREIGN PATENT DOCUMENTS

| | | |
|---|---|---|
| 1345091 | 4/1902 | France . |
| 2236101 | 1/1975 | France . |
| 1494400 | 12/1977 | United Kingdom . |
| 1524641 | 9/1978 | United Kingdom . |
| 1549195 | 7/1979 | United Kingdom . |

*Primary Examiner*—George L. Walton
*Attorney, Agent, or Firm*—Millen, White, Zelano, & Branigan, P.C.

[57] ABSTRACT

A hydraulic pilot valve has a joystick which is normally maintained in a neutral position by coil springs acting on plungers which engage corresponding first cam surfaces of a cam fixed to the joystick. The plungers are each connected to respective valve members which are stroked to open the pilot valve when the plungers are depressed. When the joystick is pivoted to depress one of the plungers by engaging the head of the plunger so as to stroke one of the valve members, that valve member is held stroked by an magnetic detent. The joystick may then be released and the valve member will remain in its stroked position. When the joystick is moved back towards a neutral position, a second cam surface on the joystick engages an outer end portion of the depressed plunger and applies an axial force to the plunger. This disengages an armature component of the magnetic detent from an electromagnetic component. A spring then pushes the plunger to its neutral position where the plunger holds the valve member operated thereby closed. In accordance with one embodiment, one joystick operates four valve members and, in accordance with another embodiment, the pilot valves are stacked. When the joystick operates four valve members, a spring biased sliding cam is mounted on the joystick for engaging the end surfaces of the plunger heads. A cam having four raised, arcuate cam surfaces is fixed to the joystick for engaging frustoconical sides of the plunger heads so that the plunger heads can be trapped between the sliding cam and raised cam surfaces to minimize slop.

6 Claims, 10 Drawing Sheets

DETENT ARRANGEMENT FOR HOLDING HYDRAULIC VALVE MEMBER STROKED

CROSS-REFERENCE TO RELATED APPLICATION

This application is a continuation-in-part of U.S. patent application Ser. No. 08/609,734, filed Mar. 1, 1996, now U.S. Pat. No. 5,638,866.

FIELD OF THE INVENTION

The present invention relates to a detent arrangement for holding hydraulic valve members stroked. More particularly, the present invention relates to hydraulic controllers which utilize magnetic detents to hold hydraulic valve members stroked.

BACKGROUND OF THE INVENTION

Joystick controllers for remotely controlled valves are in wide use. It is the current practice to utilize magnetic detents to retain a joystick in its stroked position when the joystick is moved from a neutral position to an operative position. Typically, the controllers are pilot valves each having two to four work ports with a joystick normally in a neutral position. When the joystick is in the neutral position, the work ports are open to the exhaust port. The joystick is moveable to numerous stroked positions to open or detent one or more of the work ports. Exemplary of such devices is the hydraulic valve detent mechanism of U.S. Pat. No. 4,342,335.

In the hydraulic valve detent mechanism of U.S. Pat. No. 4,342,335, plungers which operate valve members have outer ends which must remain in contact with an operating cam on the joystick at all times. This causes wear between the outer ends of the plungers and the cam which operates the plungers. By having the plungers in continuous engagement with the cam, considerable clearance is needed for operation of the cam. Consequently, the cam must be relatively large. The larger the cam, the more the cam moves away from the pivot point, necessitating more clearance to ensure operation. Since in U.S. Pat. No. 4,342,335 it is necessary to utilize the force exerted by one plunger to keep the other plunger stroked, the force exerted by the unstroked plunger on the operating cam is about two to four times the force exerted by an individual plunger when the cam is in the neutral position. This excess force creates additional friction and the additional friction results in an increase in the force necessary to move the joystick. On occasion, the frictional forces may be so high that the joystick is prevented from returning to its neutral position from its stroked position.

SUMMARY OF THE INVENTION

In view of the aforementioned considerations, it is a feature of the present invention to provide a new and improved detent mechanism for joysticks used with hydraulic valves wherein frictional forces are reduced to provide a lighter touch and to reduce wear while maintaining a minimal footprint.

The present invention is directed to a joystick operated hydraulic valve having a casing with at least first and second work ports; at least first and second valve members disposed to open and close the respective first and second work ports; and at least first and second operating plungers each having outer ends and being biased to a neutral position within the casing. The first and second operating plungers are engageable with the first and second valve members. At least one joystick is pivotally mounted on the casing and operably engages the outer ends of the operating plungers to allow pivotal movement of the joystick in one direction to cause one of the operating plungers to move inwardly toward from a neutral position a depressed position in order to stroke the respective valve member while the other operating plunger remains in the neutral position. In accordance with the present invention, the improvement comprises at least first and second detents within the casing for latching against axial movement the first and second plungers, respectively. Each of the detents have first components which are stationary with respect to the first and second plungers and second components which are fixed to the first and second plungers. The second components are disposed between the outer ends of the plungers and the first components and act to hold the respective operating plunger depressed and the valve members stroked. First cam surfaces on the joystick engage the outer ends of the first and second plungers. The first cam surfaces depress the first plunger to stroke the first valve member upon pivoting the joystick in a first direction and depress the second plunger to stroke the second valve member upon pivoting the joystick in a second direction. Second cam surfaces on the joystick engage the outer ends of the plungers when the plungers are depressed to pull the plungers and to thereby disengage the first and second components of the detents from one another to unstroke the valve.

In accordance with another aspect of the invention, a single joystick strokes more than two and preferably four valve members and in accordance with still another aspect of the invention, hydraulic valves are stacked side-by-side with each valve having a separate joystick.

In accordance with still another aspect of the invention, the first cam surfaces are moveable with respect to the second cam surfaces and are biased toward the second cam surfaces.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
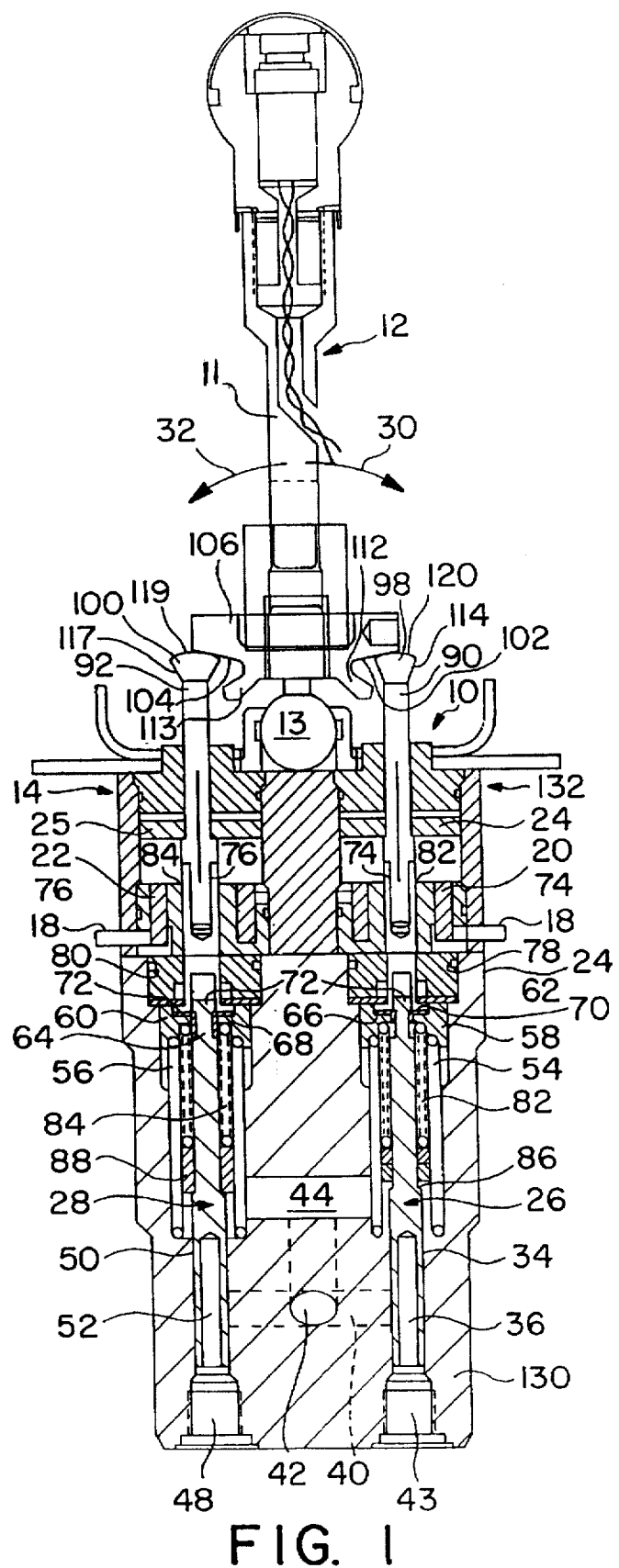
FIG. 1 is a side elevation, with parts broken away, of a first embodiment of a hydraulic pilot valve, configured in accordance with the features of the present invention, showing a joystick in a neutral position.
Figure 2:
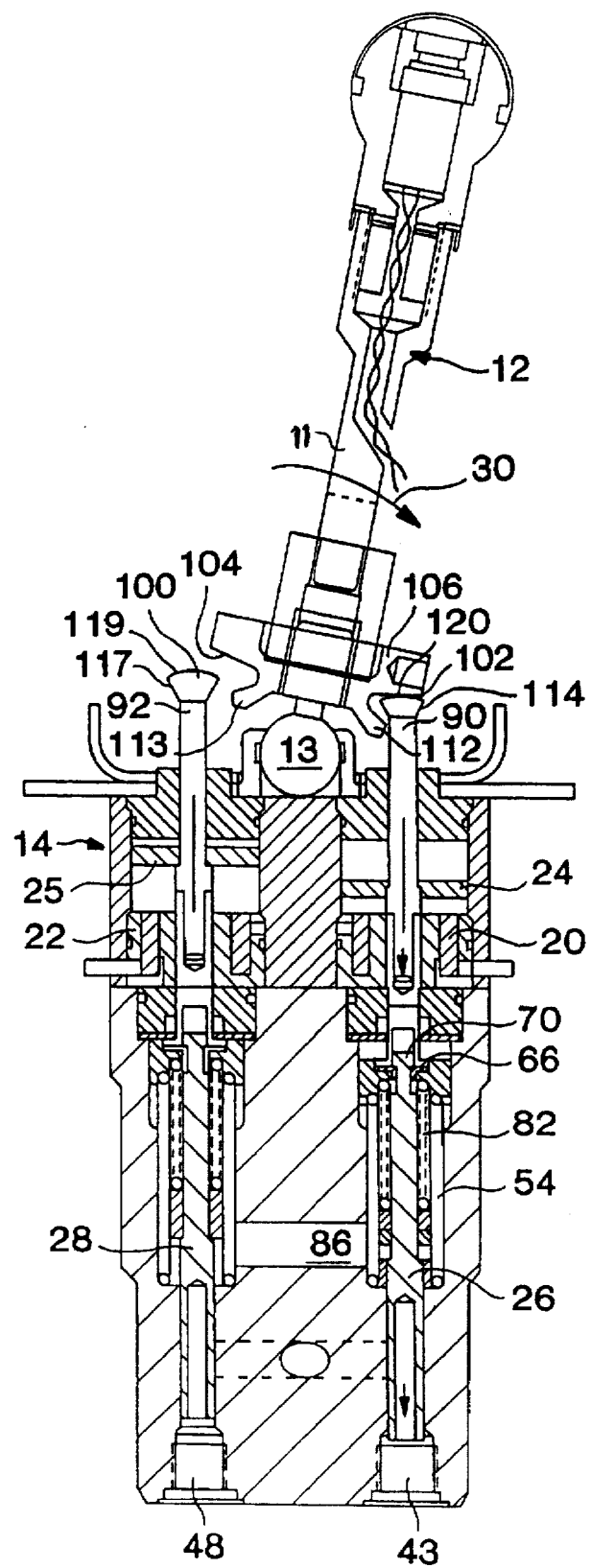
FIG. 2 is a view similar to FIG. 1, but showing the joystick stroking a valve member.
Figure 3:
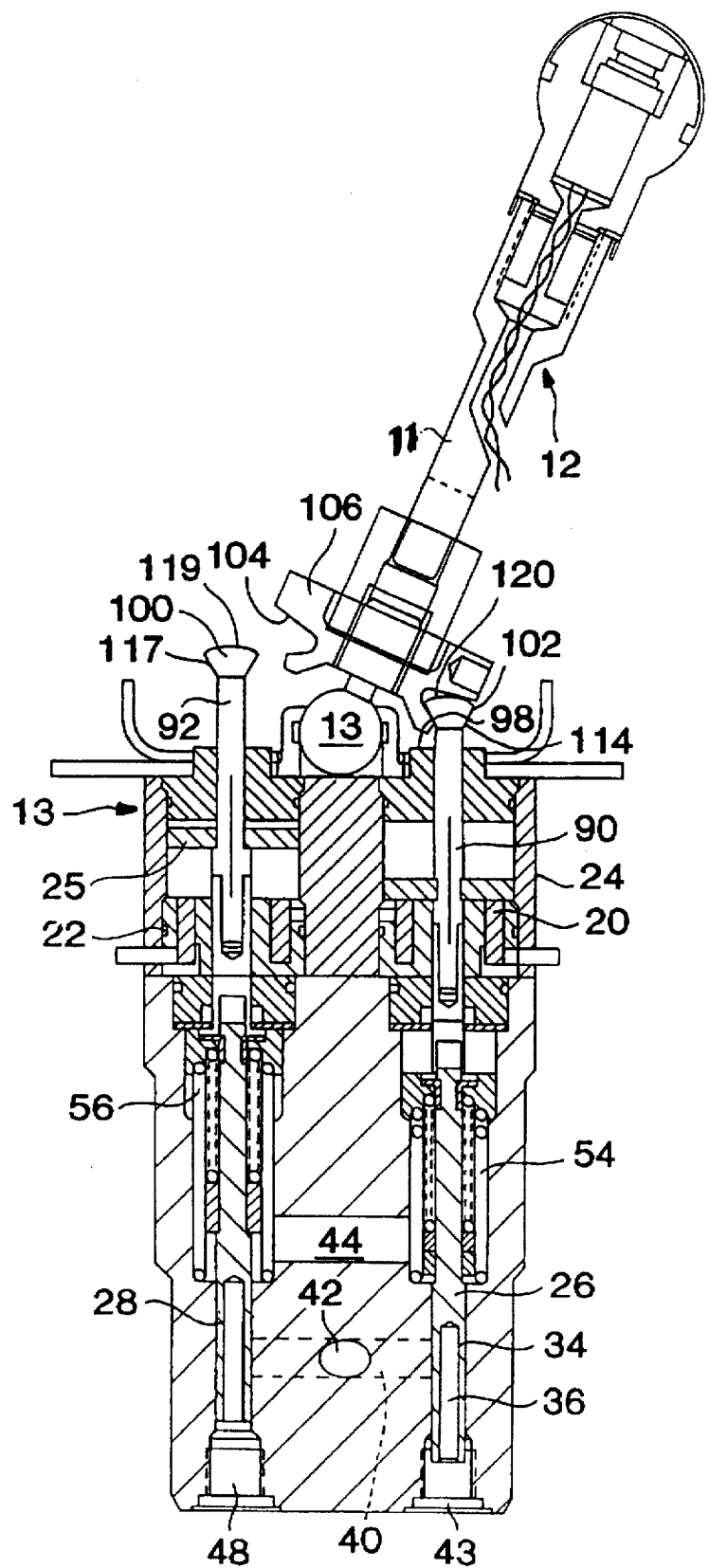
FIG. 3 is a view similar to FIGS. 1 and 2, but showing the valve member fully stroked and the joystick retained in a first detented position.

Referring now to FIGS. 1–4, there is shown a pilot valve 10 configured in accordance with the principles of the present invention, wherein the pilot valve includes a shaft 11 of a joystick 12 pivoted by a ball and socket 13 on a valve casing 14. Electromagnets 20 and 22 positioned in the casing 14 are aligned with armatures 24 and 25, respectively which engage the electromagnets to hold respective valve members 26 and 28 in the stroked position, as is illustrated in FIG. 3.

The valve members 26 and 28 are shown in an unstroked position in FIG. 1 with the joystick 12 in the neutral position. The joystick 12 can move in the direction of arrow 30 to stroke the valve member 26 and in the direction of arrow 32 to stroke the valve 28. When the valve member 26 is stroked, an inlet port 34 therein aligned with a central bore 36, moves into communication with an inlet passage 40 connected to an inlet port 42. Consequently, hydraulic fluid flowing into the inlet port 42 flows through the central bore 36 of the valve member 26 and out of a first work port 43. When the valve member 26 is in the unstroked position of FIG. 1, the passage 34 therethrough is out of alignment with the passage 40 so that flow through the inlet port 42 is precluded and fluid flowing into the first work port 43 is exhausted into an exhaust passage 44 and back to tank (not shown). Likewise, the second work port 48 is connected by the valve member 28 through ports 50 which communicate with a central bore 52 in the second valve member 28. In the FIG. 1 position, the ports 50 in the second valve member 28 are also open to tank. When the second valve member is stroked, port 50 allows hydraulic fluid to flow out of the second work port 48 and into tank 44.

The valve members 26 and 28 are biased to their unstroked positions by first springs 54 and 56 that engage couplings 58 and 60, respectively. The couplings 58 and 60 include circular recesses 62 and 64, respectively, and washers 66 and 68, respectively aligned with the circular recesses. The washers 66 and 68 retain end lugs 70 and 72 on the valve members 26 and 28 in a lost motion relationship with the couplings 58 and 60. The couplings 58 and 60 have stems 74 and 76, respectively which extend upwardly therefrom through annular guide blocks 78 and 80 and central apertures 82 and 84 in the electromagnets 20 and 22. Extending between the couplings 58 and 60 are second springs 82 and 84 which abut shoulders 86 and 88 on the valve members 26 and 28 to meter the flow to the work ports 43 and 48. Consequently, when the couplings 58 and 60 move downwardly against the bias of first springs 54 and 56, the second springs 82 and 84 urge the valve members 26 and 28 toward the stroked position of FIG. 3.

The couplings 58 and 60 are connected to the joystick 12 by plungers 90 and 92, respectively which seat within bores 94 and 96 in the coupling stems 74 and 76. Plunger 90 has a head 98 while the plunger 92 has a head 100. The heads 98 and 100 are urged upwardly by the first springs 54 and 56 to a valve closed or unstroked position. The head 98 engages a first cam surface 102 while the head 100 engages a second cam surface 104 of a cam 106 which is fixed to the joystick 12. As is seen in FIG. 1, the armatures 24 and 25 are fixed to the plungers 90 and 92 and are held in spaced relation to the electromagnets 20 and 22 when the joystick 12 is in the neutral position.

Referring now to FIG. 2, it is seen that the joystick 12 is rotating in the direction of arrow 30 about the ball joint 13 so as to depress the plunger 90 and to stroke the first valve member 26 against the bias of the first spring 54. Since the operation of the second valve member 28 is identical to the operation of the first valve member 26, rotation of the joystick 12 in the opposite direction of arrow 32 (see FIG. 1) strokes the second valve member 28 in an identical fashion. Accordingly, only rotation of the joystick 12 in the direction of arrow 30 as is shown in FIG. 2 is discussed.

As is seen in FIG. 2, a first cam surface 102 on the cam 106 is caming down the plunger 90 and moving the armature 24 toward the energized electromagnet 20. While this is happening, the second coil spring 82 is pushing against the shoulder 86 of the first valve member 26 to urge the first valve member downwardly and to meter the flow of fluid out of passage 40, through passage 34, through central bore 36, and out to the work port 43.

Referring now to FIG. 3, it is seen that the armature 24 is engaged with the electromagnet 20 to hold the plunger 90 in the depressed condition which in turn holds first valve member 26 stroked so that the port 34 therein which is aligned with the bore 36 is in communication with passage 40 in the valve body. Hydraulic fluid will then freely flow from the inlet 42 through the passage 40 and out through the first work port 43. When the joystick 12 is in the position of FIG. 3, the operator may release the handle of the joystick and the joystick will remain in the FIG. 3 position because the electromagnet 20 is magnetically retaining the iron armature 24 which is fixed on the plunger 90. Note that the cam surface 104 is now displaced from the head 100 of the stem 92 so that the only pressure against the cam 106 is the pressure applied by the first coil spring 54.

Figure 4:
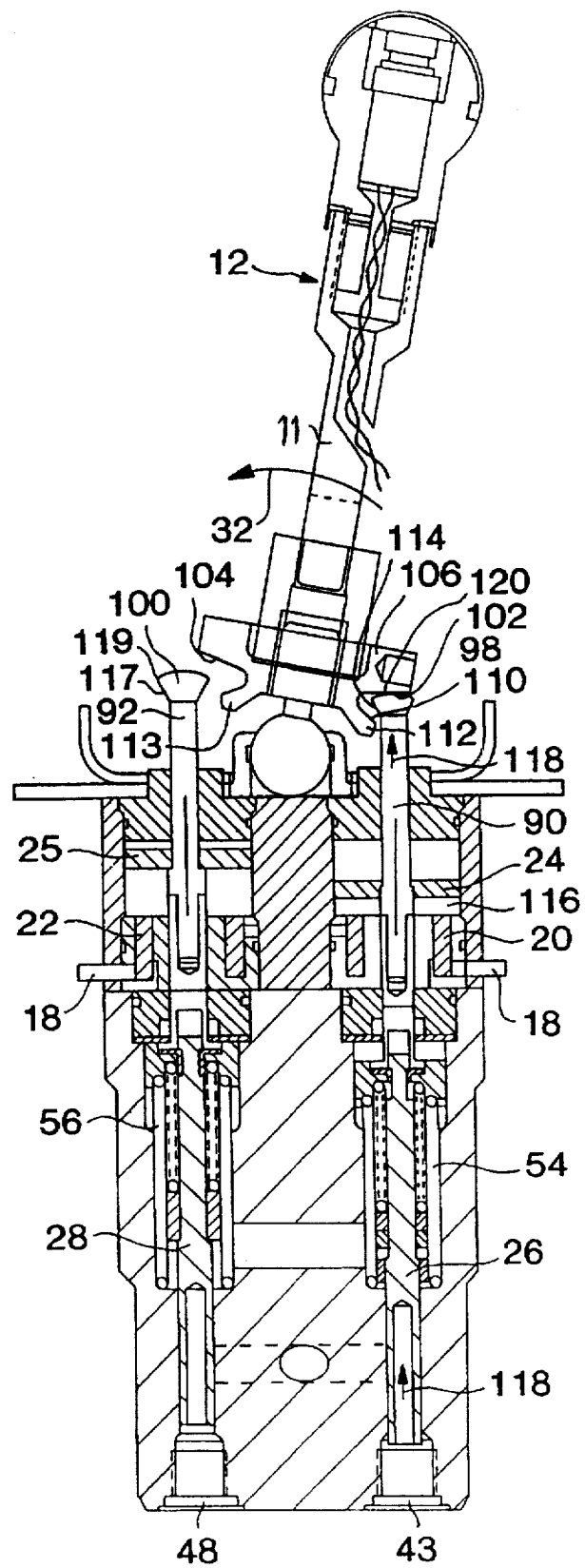
FIG. 4 is a view similar to FIGS. 1-3, but showing the valve member undetented and moving back toward the neutral position of FIG. 1.

Referring now to FIG. 4, when the joystick 12 is pivoted back toward the neutral position of FIG. 1, a second cam surface 110 on a lug 112 of the cam 106 engages a frusto-conical surface 114 on the head 102 of the plunger 90 to apply a positive force to the plunger so as to mechanically disengage the armature 24 from the electromagnet 20. Once a gap 116 occurs between the armature 24 and the electromagnet 20, the first spring 54 pushes the plunger 90 upwardly in the direction of arrows 118 which pulls the first valve member 26 upwardly back toward the neutral position of FIG. 1. When the joystick 12 returns to the FIG. 1 position, the cam 106 has again positioned the first cam surface 104 thereof in engagement with the head 100 while the second cam surface 102 is in engagement with the head 98. The first coil springs 54 and 56 then retain the joystick in its neutral position by acting against the cam surfaces 102 and 104. If it is desired that the joystick 12 not have any play, then it is important that the outer ends 100 and 98 both engage respective surfaces 102 and 104, but if slight play in the joystick 12 is desirable or unimportant, then the outer ends need not always engage the surfaces 102 and 104 when the joystick 12 is in the neutral position.

With the arrangement of FIGS. 1–4, only two first springs 54 and 56 are needed because the lugs 112 and 113 engage the outer ends 98 and 100 of the plungers 90 and 92 to pull the plungers from the depressed position of FIG. 3 so as to break contact between the armatures 24 and 26 and the electromagnets 20 and 22. In the prior art arrangement of FIG. 5, when one moves the joystick 124 from a stroked position to an unstroked position, the cam 126 corresponding to the cam 106 of FIGS. 1–4 must work against the spring 120 or 122 of the undepressed plunger. Thus, there is an additional friction force to overcome. This results in a heavier touch for the joystick 124 as compared to the joystick 12. In addition, the prior art arrangement of FIG. 5 utilizes additional springs 120 and 122 in its operation so that three springs rather than two springs are required.

Figure 5:
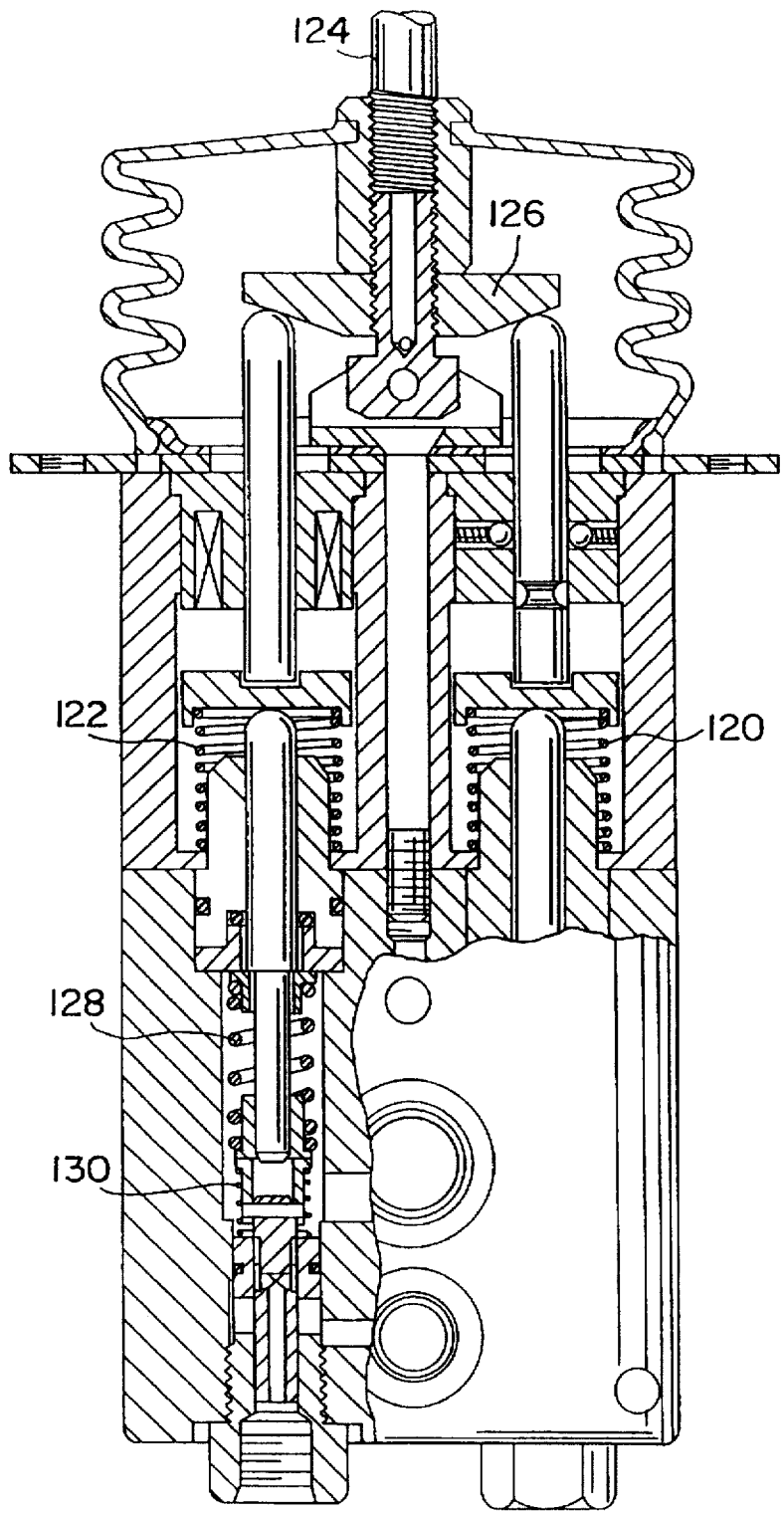
FIG. 5 is a view similar to FIGS. 1-4, but showing a prior art configuration of a pilot valve over which the present invention is an improvement.

Since the electromagnets 20 and 22 of FIGS. 1–4 are within the casing 14 of the hydraulic pilot valve 10, the hydraulic pilot valve 10 of the present invention has a footprint which is no greater than the footprint of the prior art hydraulic pilot valve of FIG. 5. Since the seals 78 in the guide blocks and 80 prevent leakage of hydraulic fluid from a lower portion 130 of the casing 14 to an upper portion 132 of the casing, the electromagnets 20 and 22 may be deleted from the casing 14 or added to the casing depending on the application with which the pilot valve 10 is used.

Figure 6:
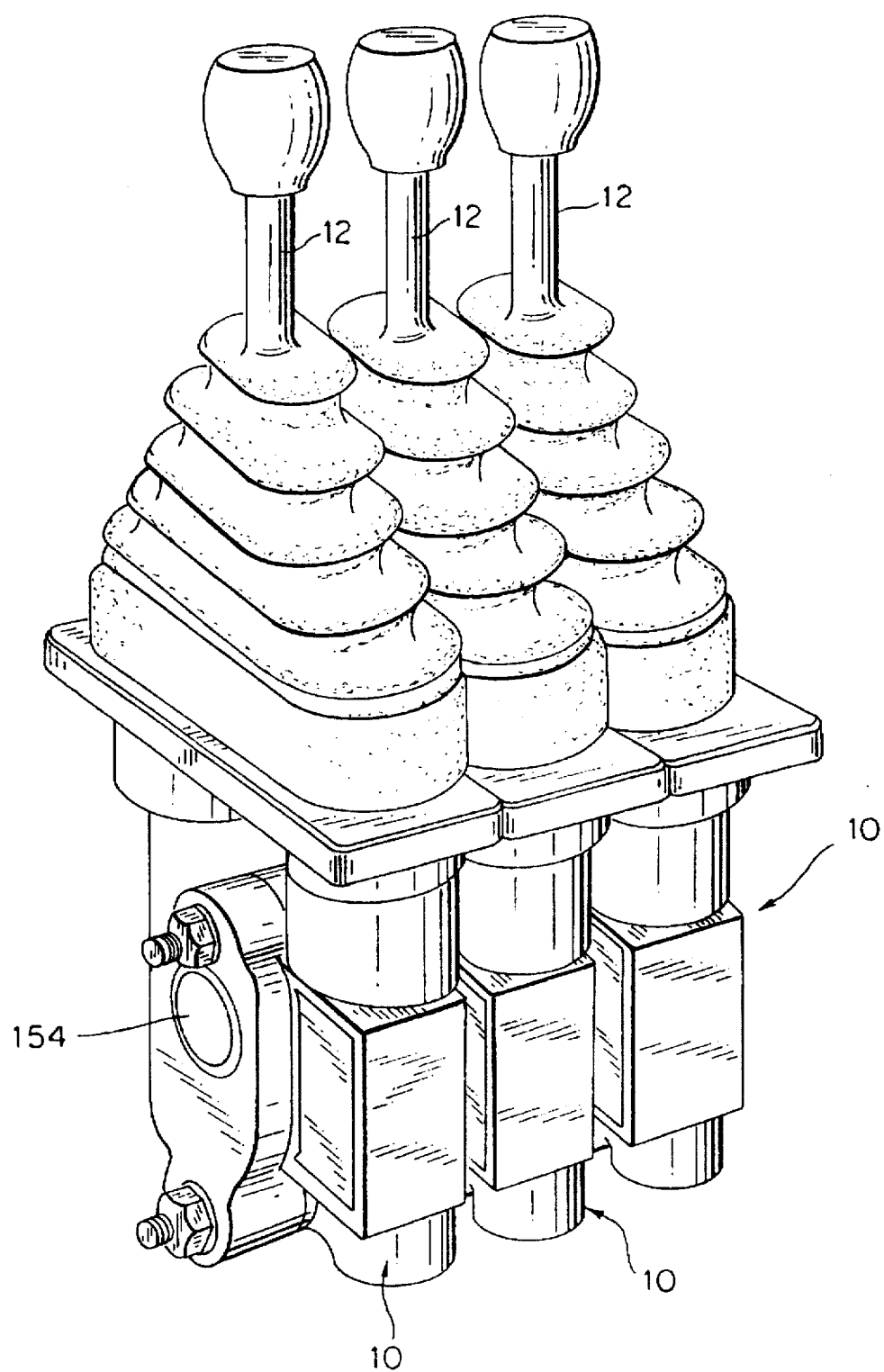
FIG. 6 is a perspective view showing a system employing a stack of hydraulic pilot valves with three of the valves shown in FIG. 1 positioned side-by-side.
Figure 7:
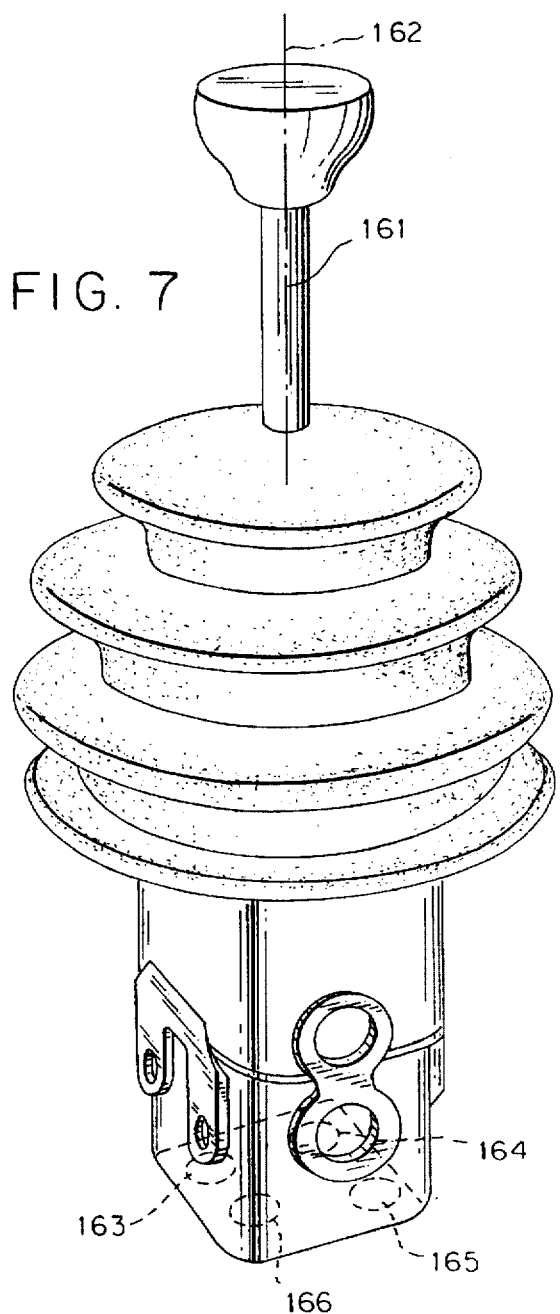
FIG. 7 is a perspective view of a second embodiment of the invention showing a pilot employing four work ports operated by a single joystick.
Figure 8:
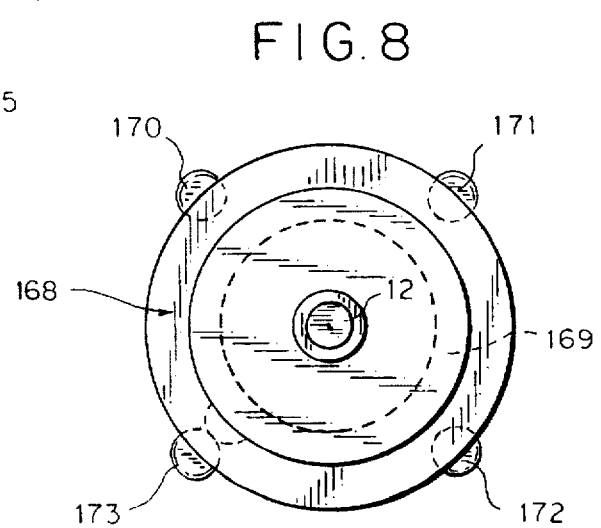
FIG. 8 is a top view of a sliding cam for operating four plungers of the four work port pilots of FIG. 7 with the single joystick.

Referring now to FIG. 6, there is shown a first system employing the invention shown in FIGS. 1–4, wherein a plurality of hydraulic pilot valves 10, each with a separate joystick 12, are attached side-by-side in a stacked pilot valve assembly 150. The stacked pilot valve assembly 150 has a common exhaust port 154 which connects to each of the exhaust ports 44 (see FIGS. 1–4) of the pilot valves 10 comprising the pilot valve assembly. In the arrangement 150 of FIG. 8, three pilot valves 10 are used; however, the number of pilot valves could be two, three, four or more depending on the application. In the arrangement of FIG. 6, the joysticks 12 are restrained to move only fore and aft as is seen in FIGS. 1–4.

Referring now to FIGS. 7–14, there is shown a second embodiment of the invention, wherein a pilot valve assembly 160 utilizes a single joystick 161 rotatable about an axis 162 to operate four work ports 163, 164, 165 and 166 by using four valve members and four plungers. This is accomplished by mounting the joystick 161 with a ball-and-socket 167, or the like, so that the joystick is rotatable about 360°, as well as being tiltable a little more than about 24° with respect to the axis 162. A slidable cam 168 having a cam surface 169, is slidably mounted on the joystick 162. Upon moving the joystick 161 about 360° of rotation, the slidable cam 168 can power, detent or release either one or two of the four work ports 163–166 simultaneously by pushing or pulling the heads 170, 171, 172 or 173 of four operating plungers 174, 176, 178 and 179 which are similar to the operating plungers 90 and 92 of the first embodiment of the invention.

Figure 9:
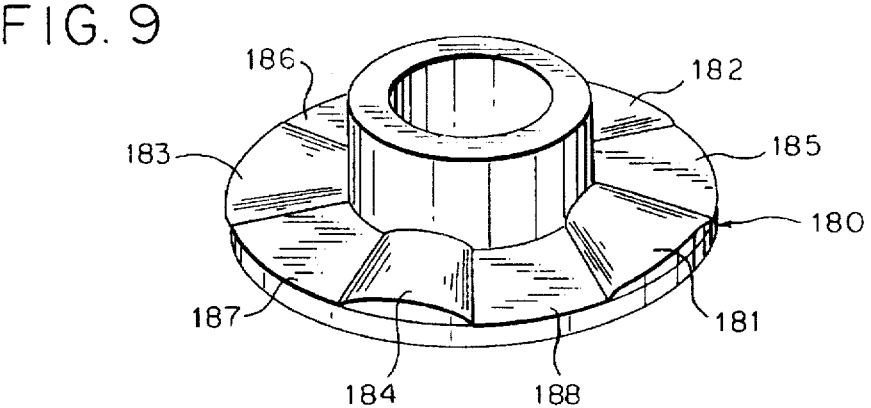
FIG. 9 is a view of a fixed cam used with the embodiment of FIGS. 7–8.

Referring now to FIG. 9, it is seen that the lugs 112 and 113 of the first embodiment have been replaced by a circular cam 180 fixed to the joystick 161. The cam 180 has four raised cam surfaces 181–184, each of which is arcuate and has a slope that complements the slope of the frustoconical side surfaces 185 of the outer ends 170–173 of plungers 175–178, respectively. The raised cam surfaces 181–184 are spaced from one another by four identical gaps 185–188. The raised cam surfaces 181–184 are identical in size, shape and spacing as are the gaps 186–189.

In order to ensure proper performance, the fixed cam 168 has a special geometry in that the surfaces that contact the outer ends 170–173 of the plungers 175–178 are configured so that if one plunger is detented, there is a selected amount of room between the raised cam surface and the cam surface 169. If two plungers 175–178 are detented at once, the geometry of the surface of the raised cam surfaces 181–184 changes to allow for additional area between the raised cam surface and slidable cam surface 169 to properly detent more than one of the plungers 175–178. Because of this changing geometry, the raised cam surfaces 181–184 need to be properly oriented in relation to the outer ends 170–173 of the plungers 175–178 for effective operation. The proper orientation is achieved by rotating or revolving the joystick 161 about the axis 162.

Further with respect to FIG. 9, the high points of the arcuate raised cam surfaces 181–184 are each in line with one of the plungers 175–178. This assures that when one of the plungers is detented that the proper distance is maintained between the selected raised cam surface and the slidable cam surface 169. As the joystick 162 rotates into a position that will activate two plungers, additional room is needed between the raised cam surfaces 181–184 and the slidable cam surface 169. The additional room needed is due to the angle of contact changing when the joystick 162 is moved to activate another plunger. The four high points of the arcuate raised cam surfaces 181–184 are rounded so, as the joystick 161 is rotated to start activating a second plunger, the cam 180 rotates down the slope of the four raised cam surfaces 181–184. This increases the vertical distance between the raised cam surfaces 181–184 and the slidable cam surface 169. Thus, by tilting and rotating the joystick 161 in different directions, the distance between the raised cam surfaces 181–184 and slidable cam surface 169 changes, allowing for proper detenting and removal from detenting whether one or two of the plungers 175–178 are activated.

As is seen in FIGS. 10–14, fixed on the shaft of the joystick 161 is a spring stop 200 having a flange 201 against which is seated a coil spring 203. The coil spring 200 bears against a shoulder 204 on a slide 205, which slide 205 has the cam surface 169 of the cam 168 thereon. The cam surface 169 engages the spherical surfaces on the heads 170–173 of plungers 175–178, respectively, and presses the heads of the plungers against the raised cam surfaces 181–184 of the fixed cam 180.

In operation, when the joystick 161 is in its neutral position (FIG. 10), the spring urged cam surface 169 engages all of the spherical end surfaces of the unstroked plungers 175–178. Since the spring urged, sliding cam 168 bears against heads of the plungers 175–178 and holds the heads against the fixed raised cam surfaces 181–184, the plungers and joystick 161 are stabilized and joystick slop is eliminated when the joystick is in the neutral position. As is illustrated in FIG. 11, if any one of the plungers 175–178 is stroked and held by one of the magnets 20 and 22 (see FIG. 3), then there is no abutment between the spherical surface of the unstroked plunger and cam surface 169 of the sliding cam 168. It is emphasized that the arrangement of FIGS. 7–14, two of the plungers 175–178 can be stroked simultaneously.

Figure 10:
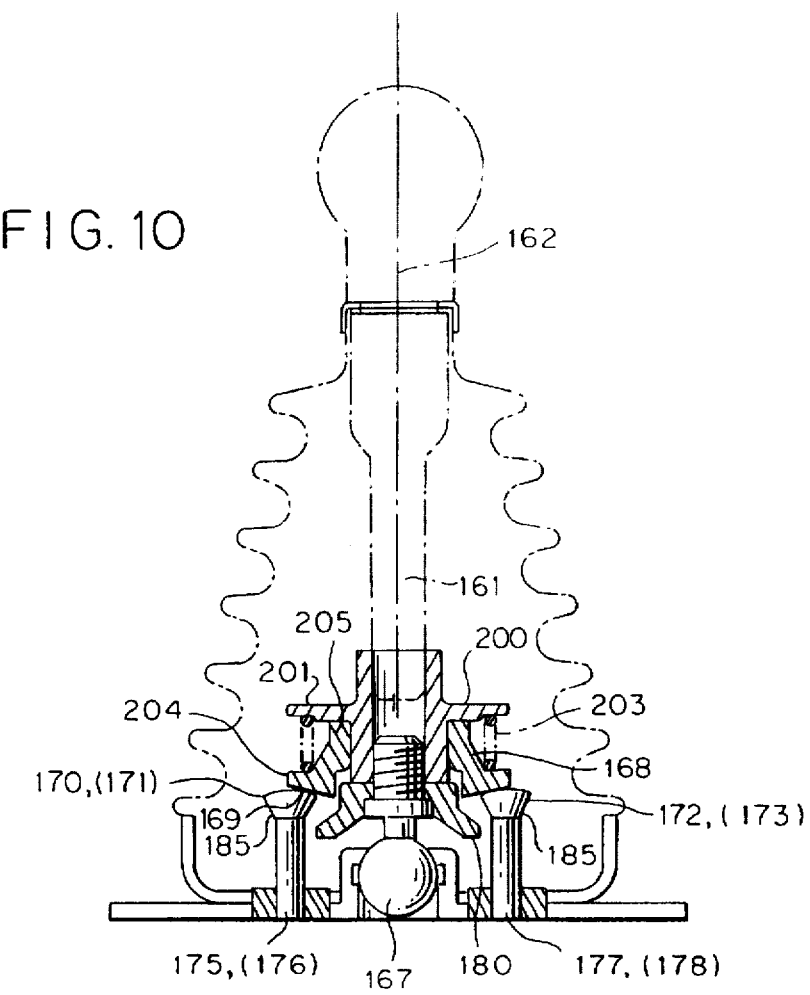
FIG. 10 is a side view of the pilot valve of FIGS. 7–9 showing two of the four plungers and the joystick in a neutral position.
Figure 12:
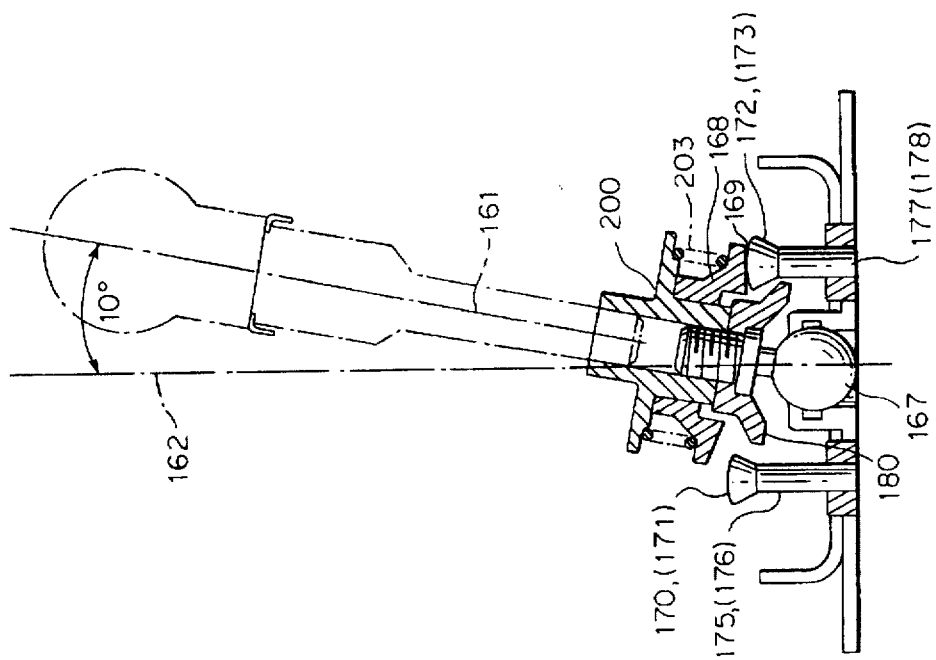
FIG. 12 is a side view similar to FIGS. 10 and 11 but showing the joystick tilted about 10°.
Figure 11:
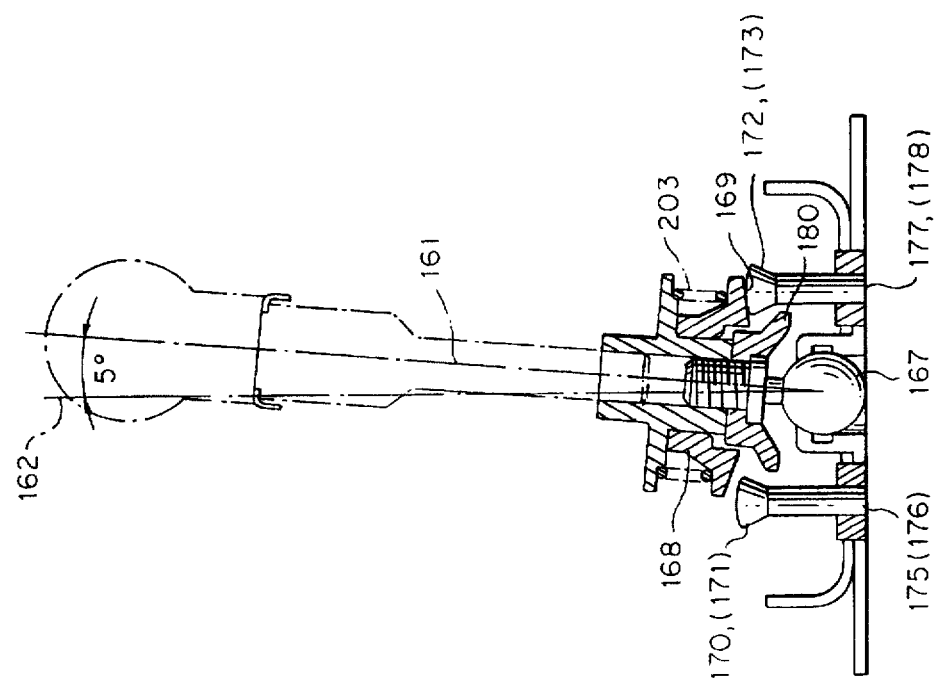
FIG. 11 is a side view similar to FIG. 10 but showing the joystick tilted about 5°.
Figure 14:
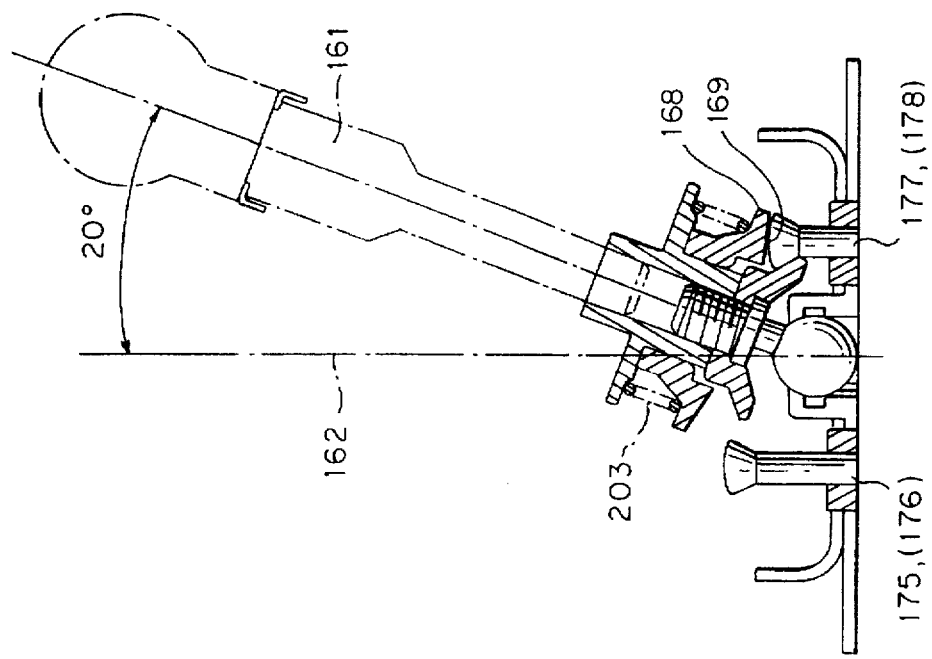
FIG. 14 is a side view similar to FIGS. 10–13 but showing the joystick tilted about 24°.
Figure 13:
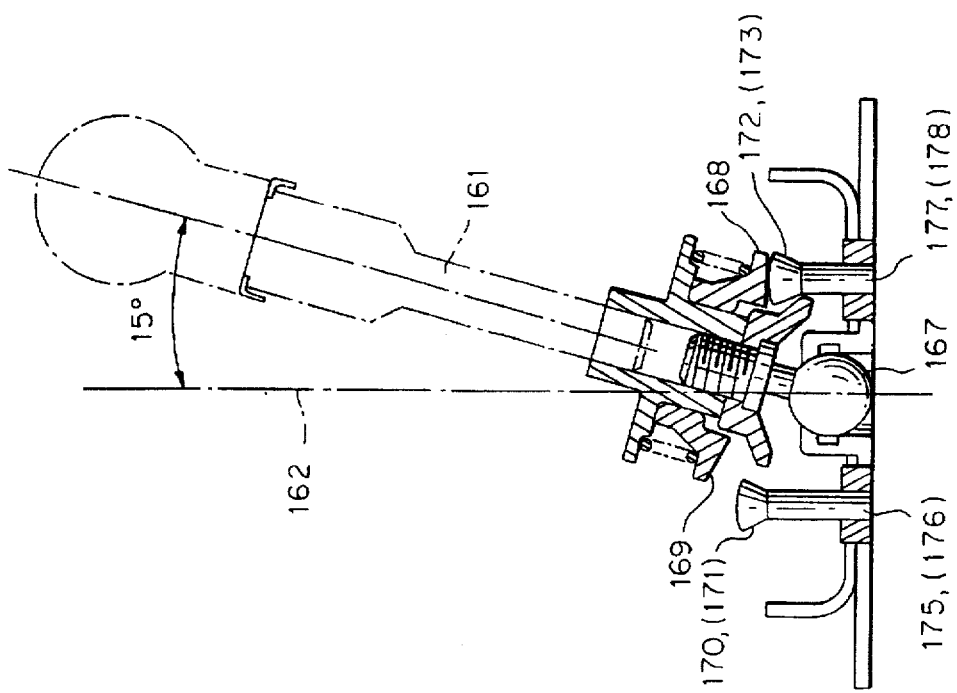
FIG. 13 is a side view similar to FIGS. 10–12 but showing the joystick tilted about 15°.

When it is decided by the operator to stroke one of the plungers 175–178, the joystick 161 is tilted from the FIG. 10 position through to the FIG. 14 position so that the cam surface 169 engages the top of one of the plungers 175–178 and one of the raised cam surfaces 181–184 engages beneath the head of that plunger. If it is desired to stroke two of the plungers 175–178, the joystick 161 is revolved slightly about the axis 162 (about 45°) to align one of the other raised cams 181–184 with the head of an adjacent plunger so that two plungers are stroked with the joystick held tilted between two of the plungers. When the joystick 161 is then tilted back toward its neutral position of FIG. 10, the engaged plunger or plungers (if two plungers are being unstroked) are pulled from the stroked to the unstroked position.

The flexible cam configuration of FIGS. 7–14 minimizes joystick slop and improves performance as well. To reiterate when the joystick is in the neutral position, the coil spring 203 pushes the cam 203 down tight onto the spherical top surfaces at the outer ends 170–173 of the plungers 175–178, eliminating neutral joystick slop. Even if the parts wear, neutral joystick slop remains eliminated. With prior art arrangements, when a plunger is detented to be held in a stroked position and the operator releases the joystick 161, the joystick is loose due to the need for tolerances. With the present invention, when a plunger is detented, the spring 203 operates the same as it does in neutral and pushes the sliding cam 168 down, reducing the distance between the sliding cam surface 169 and the raised cam surfaces 181–184, thus tightly trapping the plunger and removing any joystick slop.

It is easier to fabricate the embodiment of FIGS. 7–14 and to assemble it, then it would be to fabricate a one piece design. This is primarily due to the difficult angles and the close tolerances needed on the parts. Dimensions are not as critical with the embodiment of FIGS. 7–14 because the sliding cam 168 compensates for differences.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a joystick operated hydraulic valve having a casing with at least four work ports; at least first and second valve members disposed to open and close the respective four work ports, and at least four operating plungers each having outer ends and being biased to a neutral position within the casing, the four operating plungers being engageable with the respective second valve members; a joystick pivotally mounted on the casing and operably engaging selective end surfaces of the outer ends of the operating plungers to allow pivotal movement of the joystick to cause up to two of the operating plungers to move inwardly from a neutral position to a depressed position to stroke the respective valve to an open position, while the other operating plungers remain in a neutral position; the improvement comprising:

detents within the casing for latching against axial movement the plungers, each of the detents having first components which are stationary with respect to the plungers and second components which are fixed to the plungers, the second components being disposed between the outer ends of the plungers and the first components and acting to hold the respective operating plunger depressed and the valve member stroked after a selected pivotal movement of the joystick;

a slidable cam cooperatively disposed between the outer ends of the plungers and a surface on the joystick for engaging the end surfaces of the outer ends of the plungers, the slidable cam having a surface depressing the plungers to stroke the respective valve member upon pivoting the joystick toward the plunger selected for operation;

a spring a spring disposed between an axial location on the joystick and an opposing location on the slidable cam for urging the slidable cam surface toward the end surface of the plungers; and a plurality of second cam surfaces disposed annularly about an axis on the joystick for engaging the outer ends of the plungers when the plungers are depressed to pull the plungers and disengage the first and second components of the detents from one another so as to unstroke to a closed position the valves.

2. The improvement of claim 1, wherein the cam surfaces on to the joystick are raised second cam surfaces with arcuate profiles, the cam surfaces being spaced from one another.

3. The improvement of claim 2, wherein there are four second cam surfaces.

4. The improvement of claim 3, wherein the outer end of the plungers each have enlarged heads providing outer surfaces facing away from end surfaces, the outer surfaces being engageable by the second cam surfaces when the plungers are depressed to lift the plungers when the joystick is moved to unstroke the valves.

5. The improvement of claim 4, wherein the first components of the detents are electromagnets and the second components of the detents are armatures.

6. The improvement of claim 1, wherein the first components of the detents are electromagnets and the second components of the detents are armatures.

\* \* \* \* \*